Oct. 21, 1952     C. E. MILLER     2,614,446
MULTIPLE SPINDLE LATHE
Filed Oct. 17, 1946     18 Sheets-Sheet 3
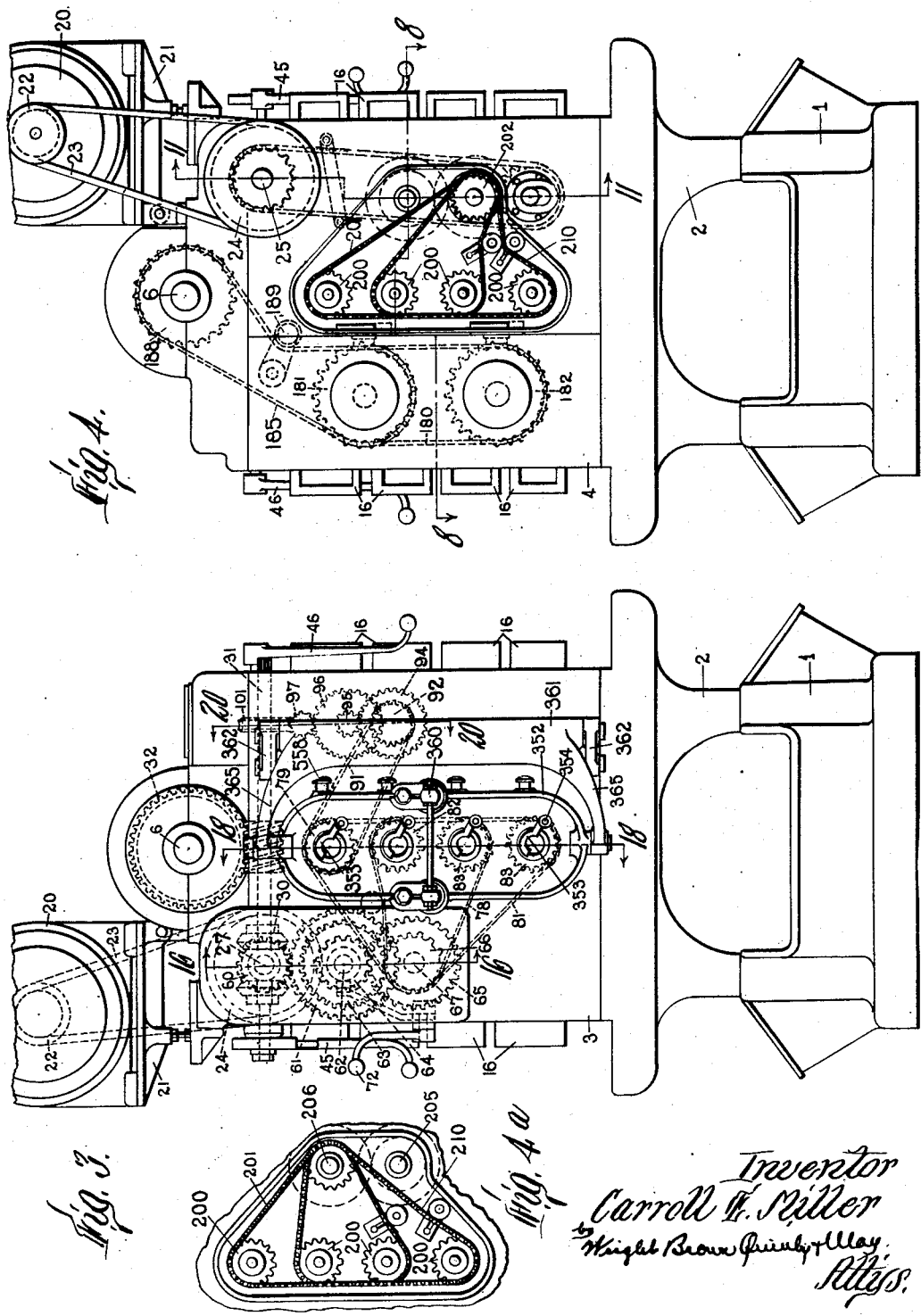

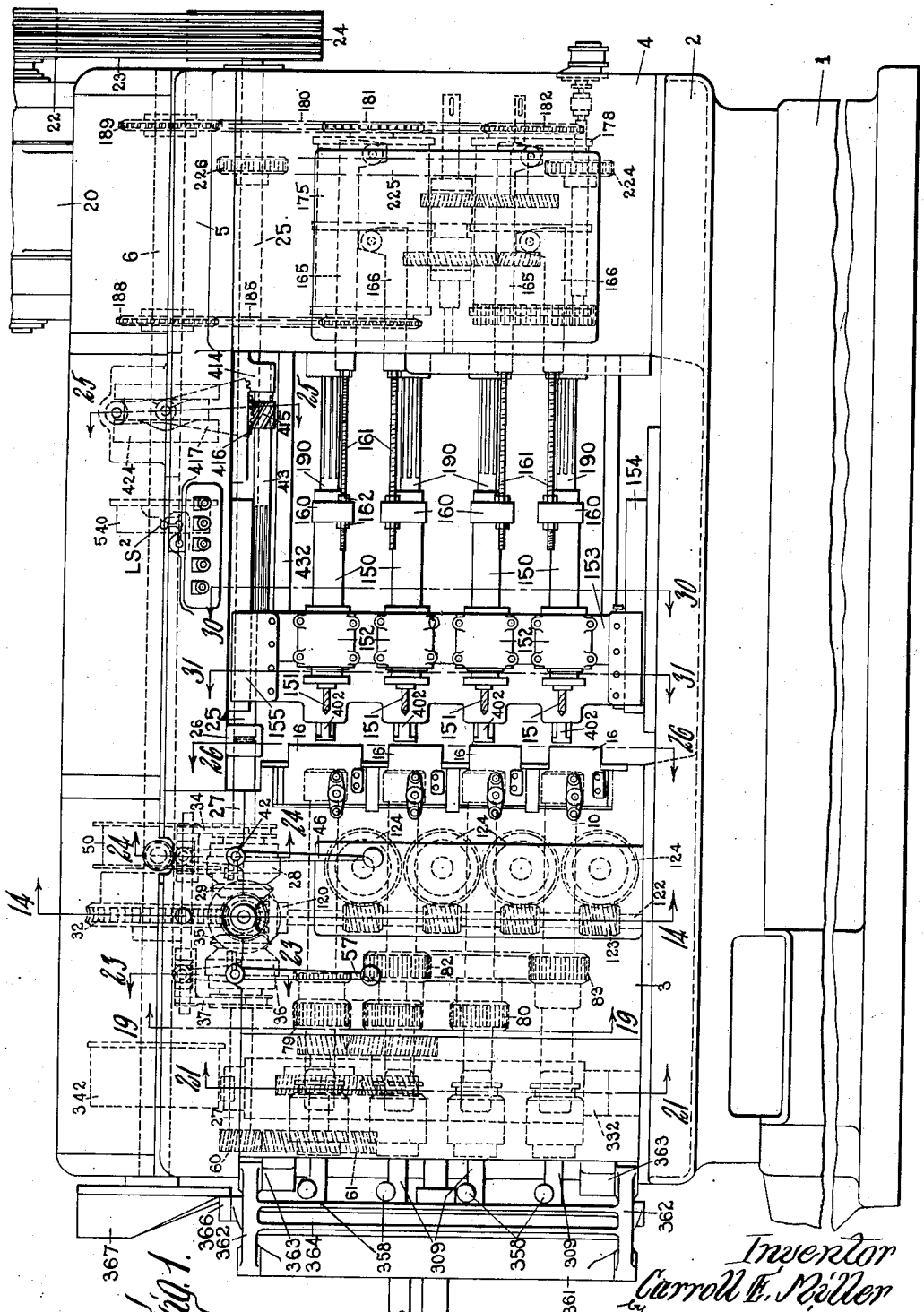

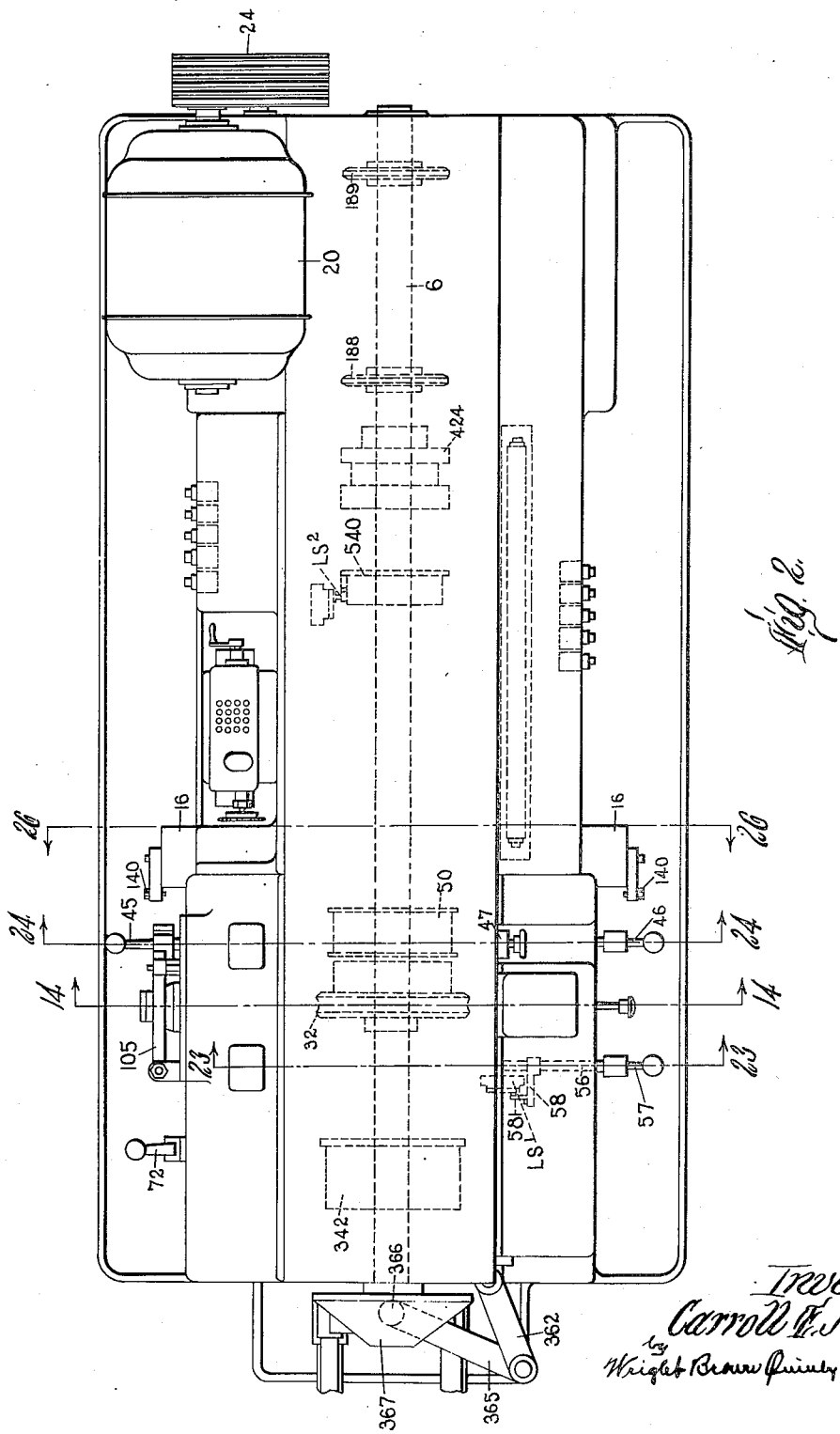

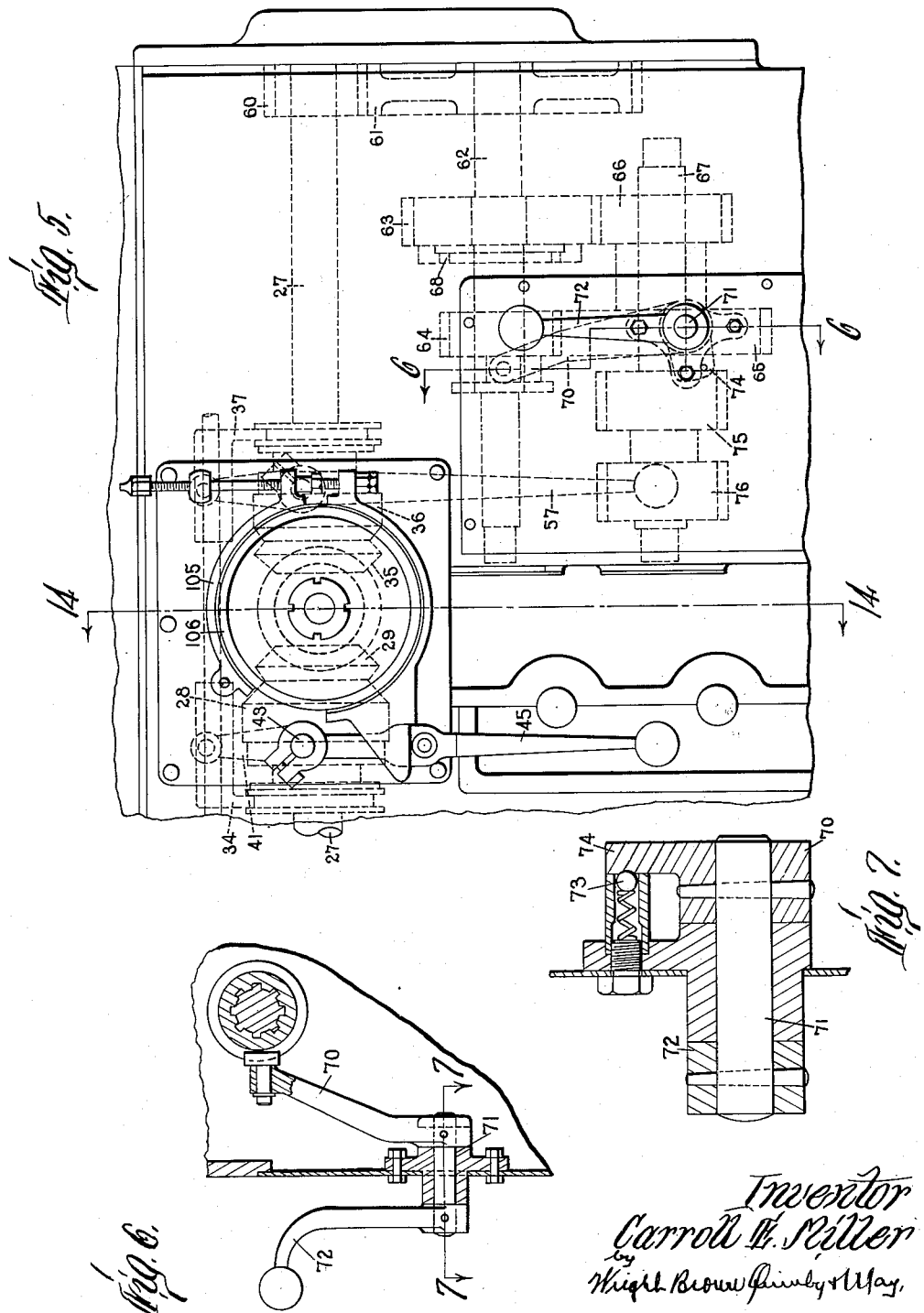

Oct. 21, 1952     C. E. MILLER     2,614,446
MULTIPLE SPINDLE LATHE
Filed Oct. 17, 1946     18 Sheets-Sheet 5

Inventor
Carroll E. Miller

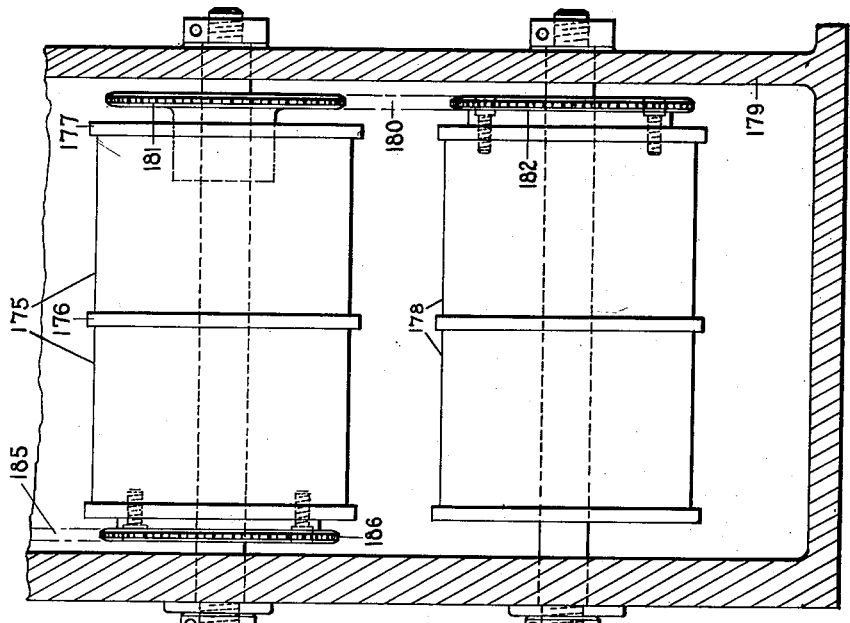
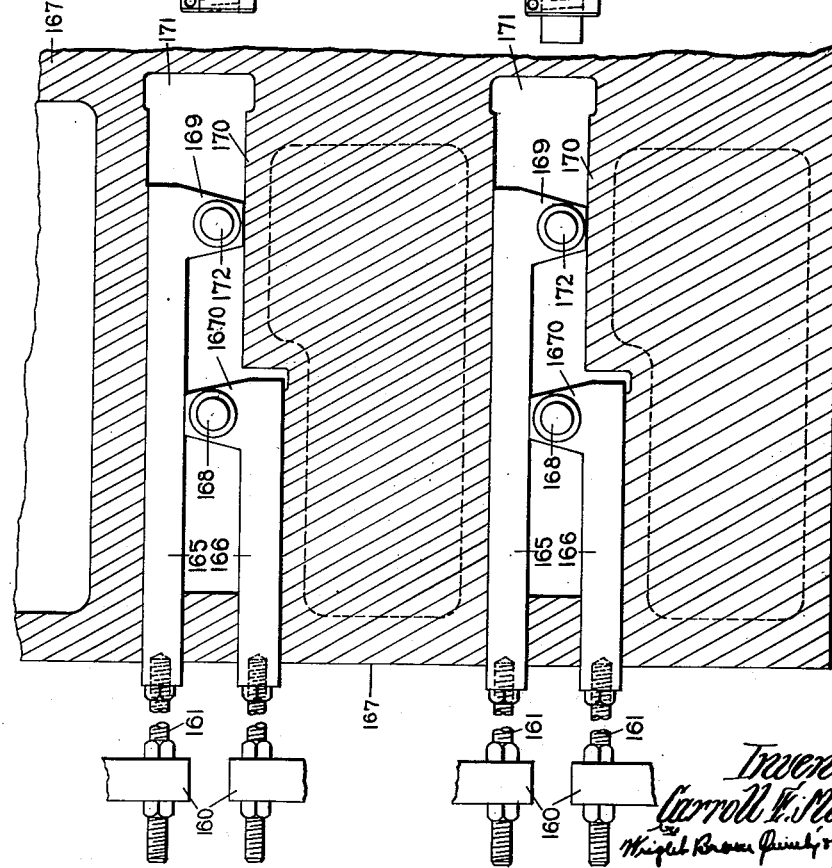

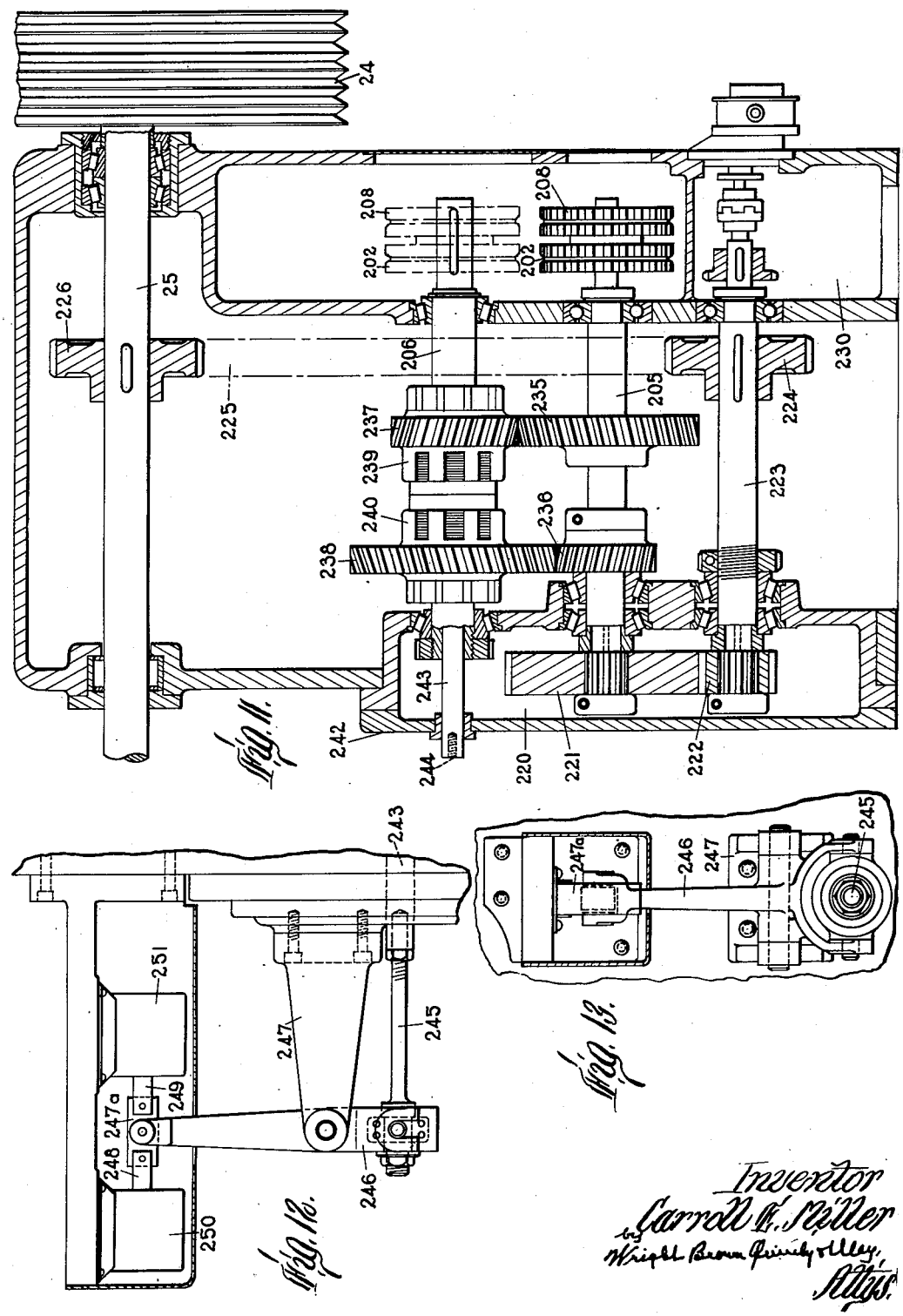

Oct. 21, 1952 C. E. MILLER 2,614,446
MULTIPLE SPINDLE LATHE
Filed Oct. 17, 1946 18 Sheets-Sheet 8

Inventor
Carroll E. Miller
by Wright Brown Quimby & May
Attys.

Oct. 21, 1952 C. E. MILLER 2,614,446
MULTIPLE SPINDLE LATHE
Filed Oct. 17, 1946 18 Sheets-Sheet 11

Inventor
Carroll E. Miller
by Wright, Brown, Quinby & May
Attys.

Oct. 21, 1952        C. E. MILLER        2,614,446
MULTIPLE SPINDLE LATHE
Filed Oct. 17, 1946                                 18 Sheets-Sheet 12
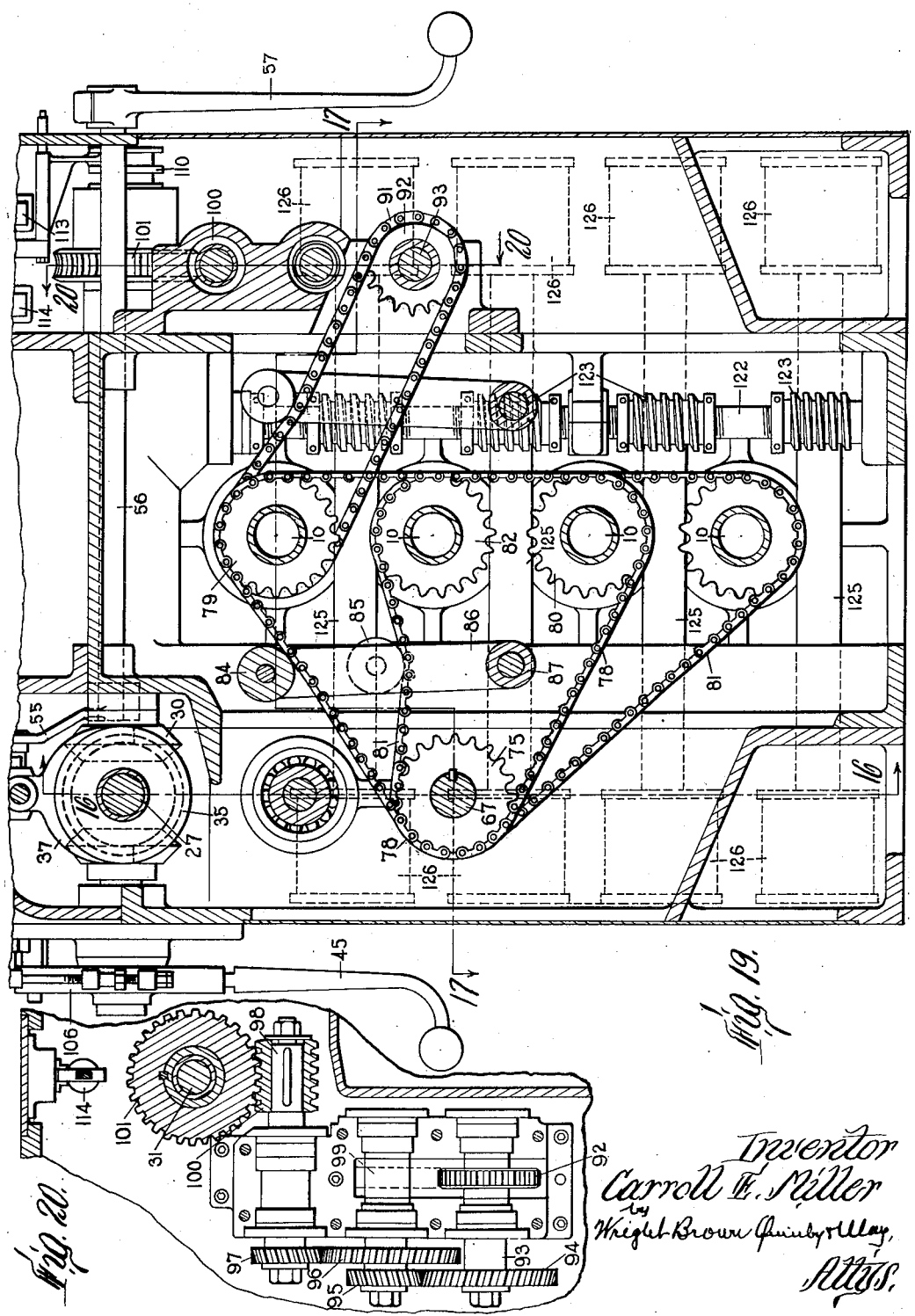
Inventor
Carroll E. Miller
by Wright, Brown, Quinby & May,
Attys.

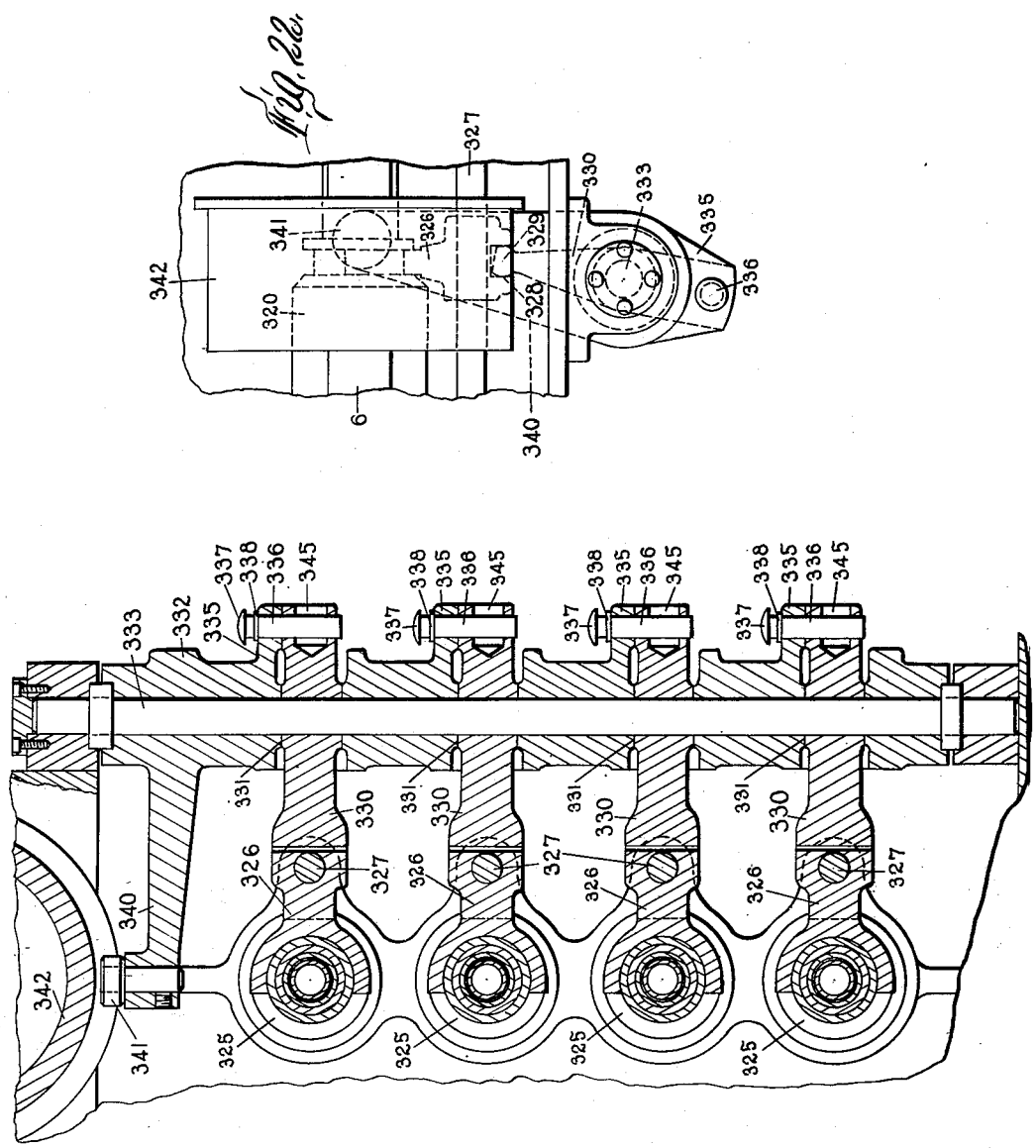

Oct. 21, 1952 — C. E. MILLER — 2,614,446
MULTIPLE SPINDLE LATHE
Filed Oct. 17, 1946 — 18 Sheets-Sheet 14
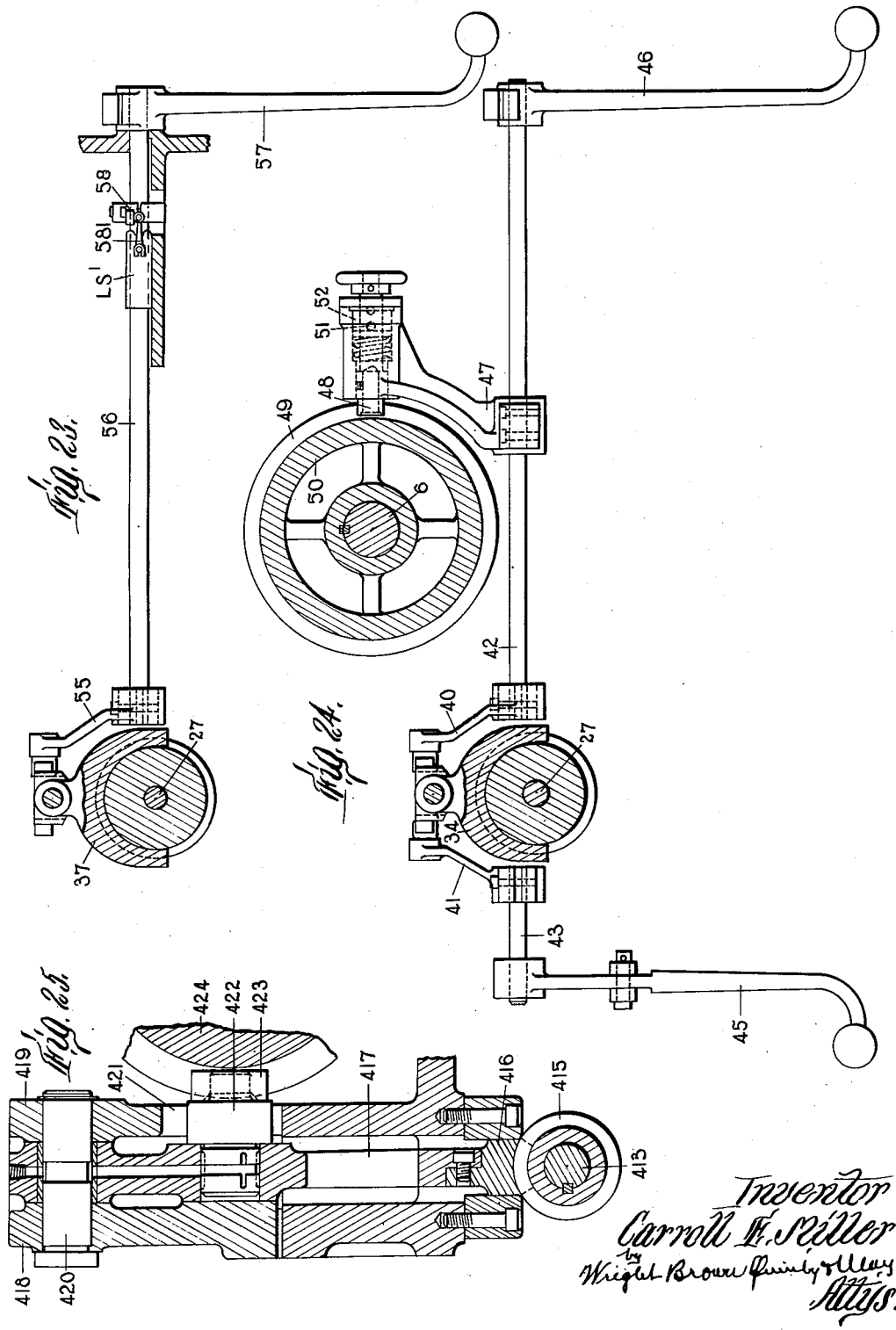
Inventor
Carroll E. Miller
by Wright, Brown, Quinby & May
Attys.

Oct. 21, 1952           C. E. MILLER           2,614,446
MULTIPLE SPINDLE LATHE
Filed Oct. 17, 1946           18 Sheets-Sheet 15
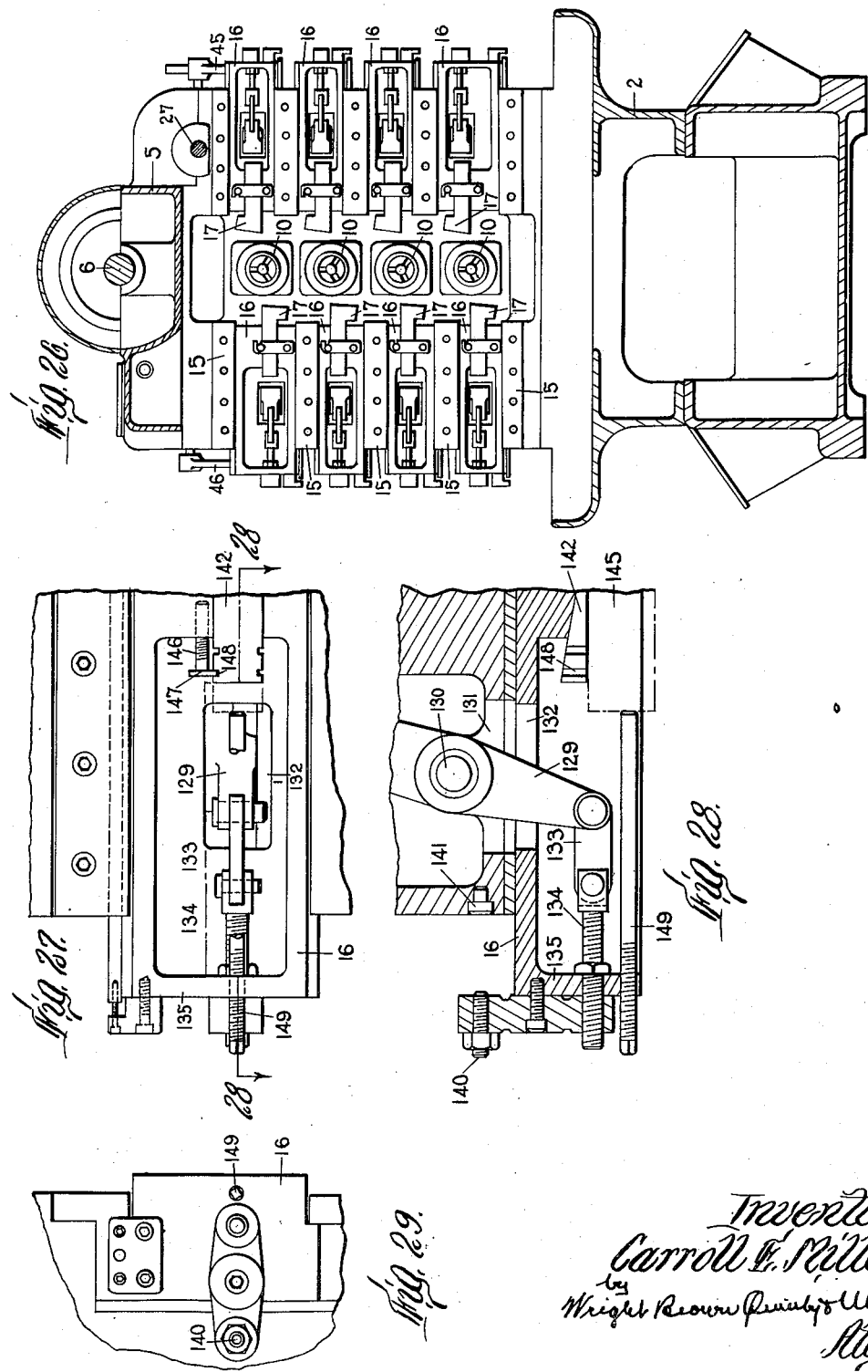

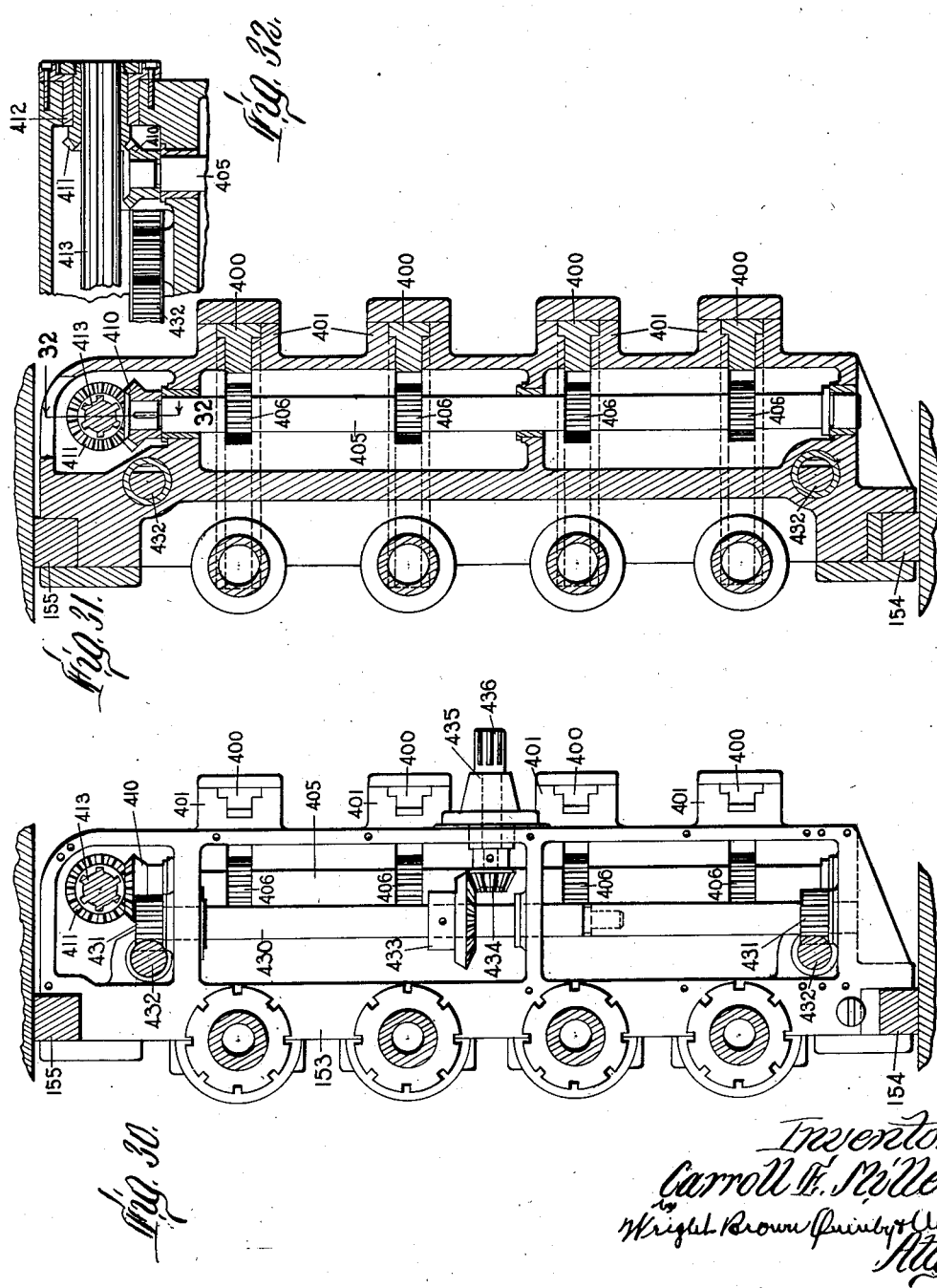

Oct. 21, 1952     C. E. MILLER     2,614,446
MULTIPLE SPINDLE LATHE
Filed Oct. 17, 1946     18 Sheets-Sheet 17
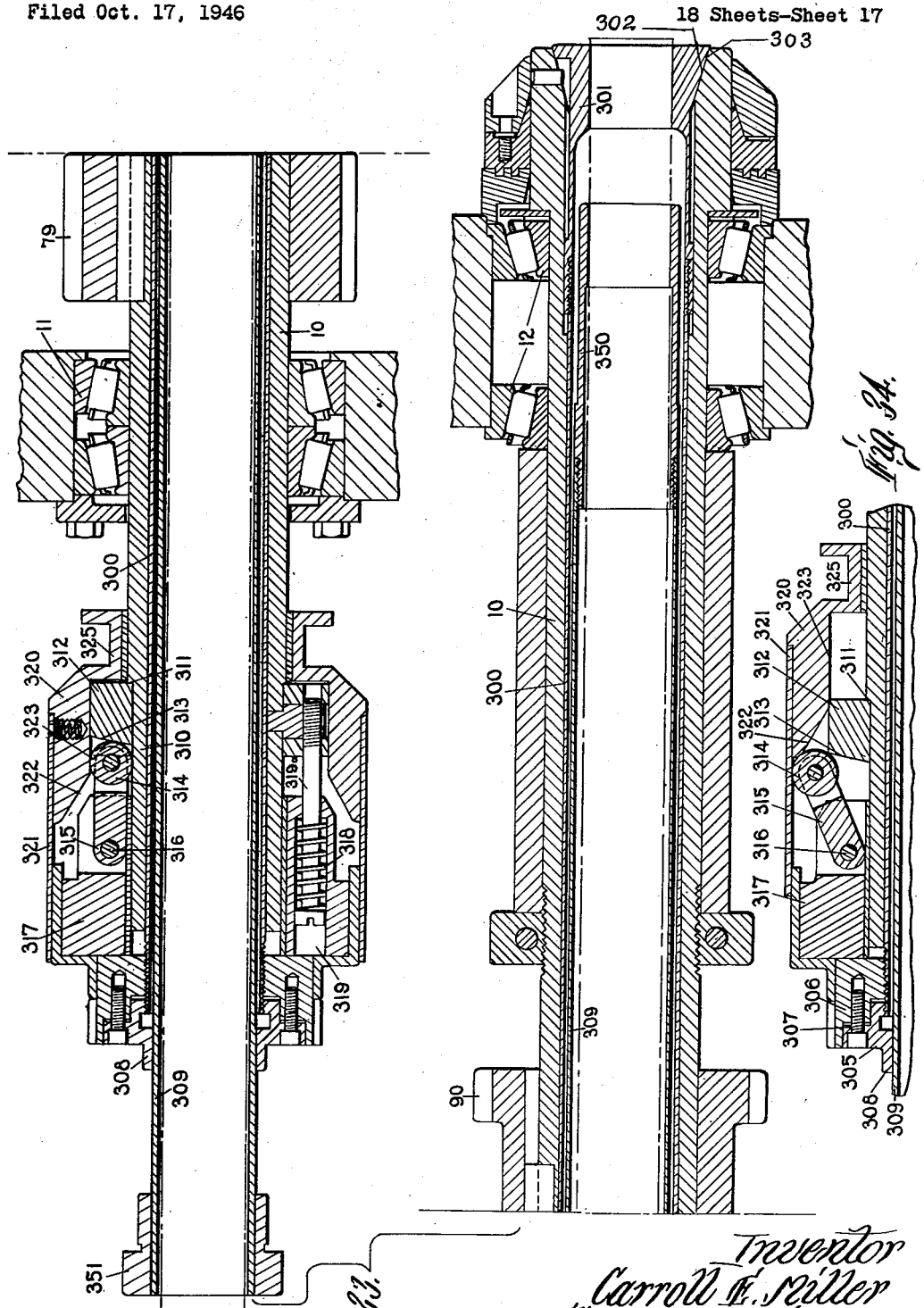
Inventor
Carroll E. Miller
by Wright, Brown, Quinby & May
Attys.

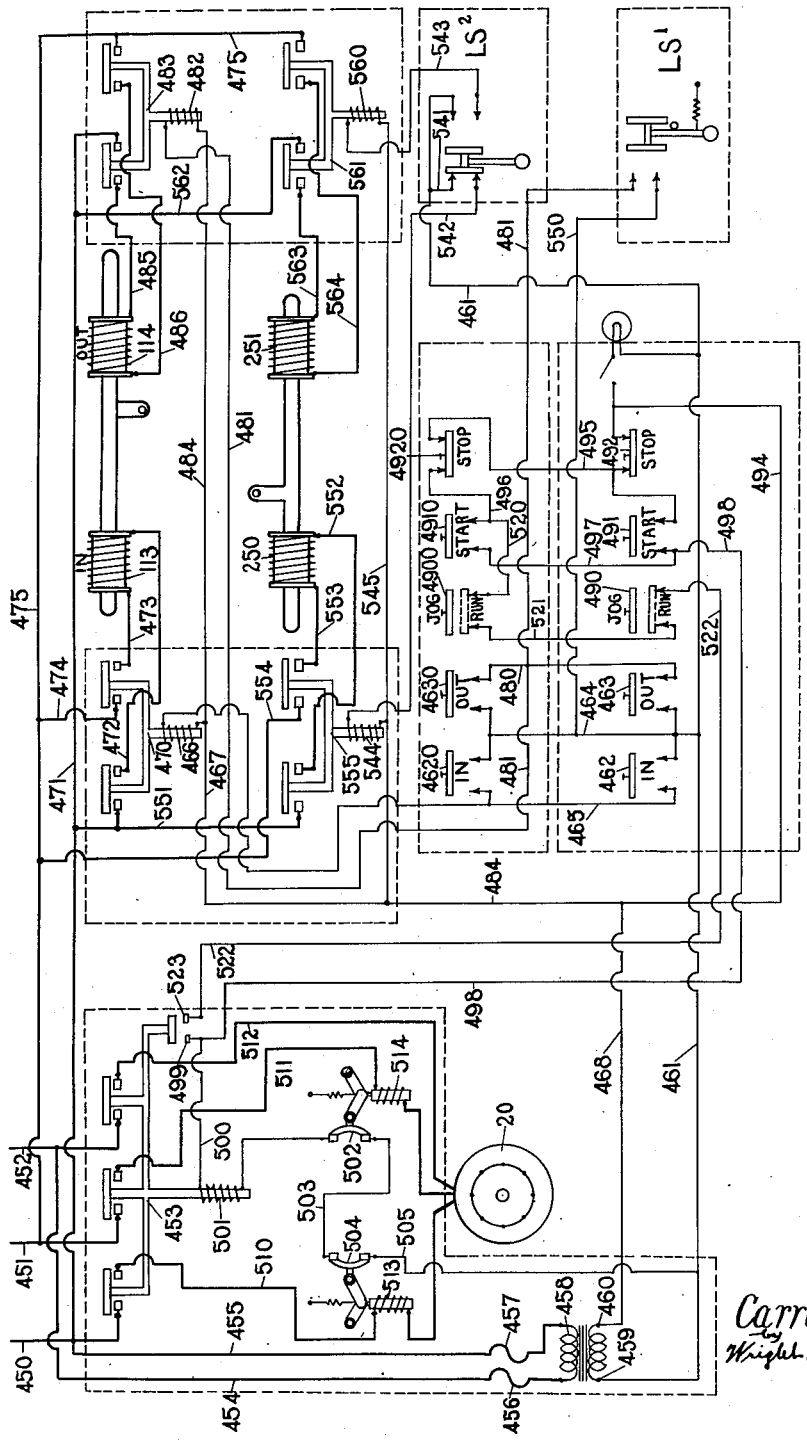

Patented Oct. 21, 1952

2,614,446

UNITED STATES PATENT OFFICE 2,614,446

MULTIPLE SPINDLE LATHE

Carroll E. Miller, Windsor, Vt., assignor to Cone Automatic Machine Company Inc., Windsor, Vt., a corporation of Vermont Application October 17, 1946, Serial No. 703,772

2 Claims. (Cl. 82—3)

This invention relates to multiple spindle lathes and more particularly to such lathes wherein the spindles are arranged in a vertical plane to form what is commonly known in the art as a vertical machine.

One object of the invention is to provide independent front and back tool slides for the several spindles so that the tooling can be independently controlled for the various spindles.

A further object is to provide for common actuation of the several tool slides from an overhead actuating member.

Another object is to provide improved end working tool mechanism and driving means therefor.

Still another object is to provide improved stock stop mechanism capable of being retracted for long work.

Still another object is to provide improved stock feed and actuating mechanism.

Further objects and advantages will appear from a description of an embodiment shown in the accompanying drawings in which:

Figure 1 is a front elevation of a multiple spindle lathe embodying the invention.

Figure 2 is a top plan view of the same.

Figures 3 and 4 are left and right hand elevations, respectively.

Figure 4a is a view similar to a portion of Figure 4, but showing the end tool drive mechanism for threading tools.

Figure 5 is a fragmentary rear elevation of the machine to a larger scale than Figure 1 and showing certain of the control mechanism.

Figure 6 is a detail sectional view on line 6—6 of Figure 5 showing a speed selector.

Figure 7 is a detail sectional view on line 7—7 of Figure 6.

Figure 8:
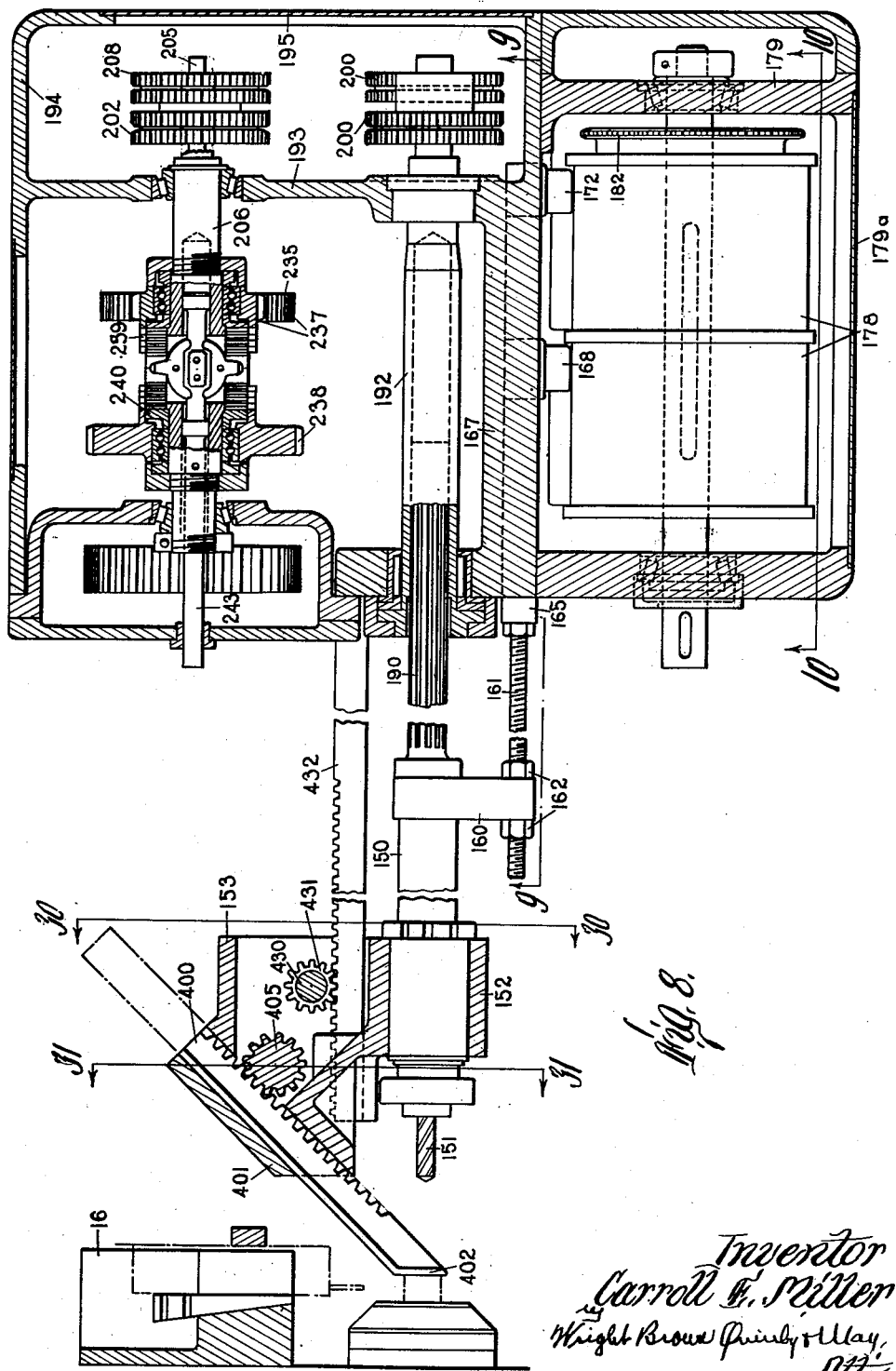
Figure 8 is a detail sectional view on line 8—8 of Figure 4.

Figures 9 and 10 are detail sectional views on lines 9—9 and 10—10, respectively, of Figure 8.

Figure 11 is a detail sectional view on line 11—11 of Figure 4.

Figure 12 is a fragmentary elevational view showing certain of the solenoid control mechanism.

Figure 13 is a view at right angles to Figure 12 of the same mechanism.

Figure 14:
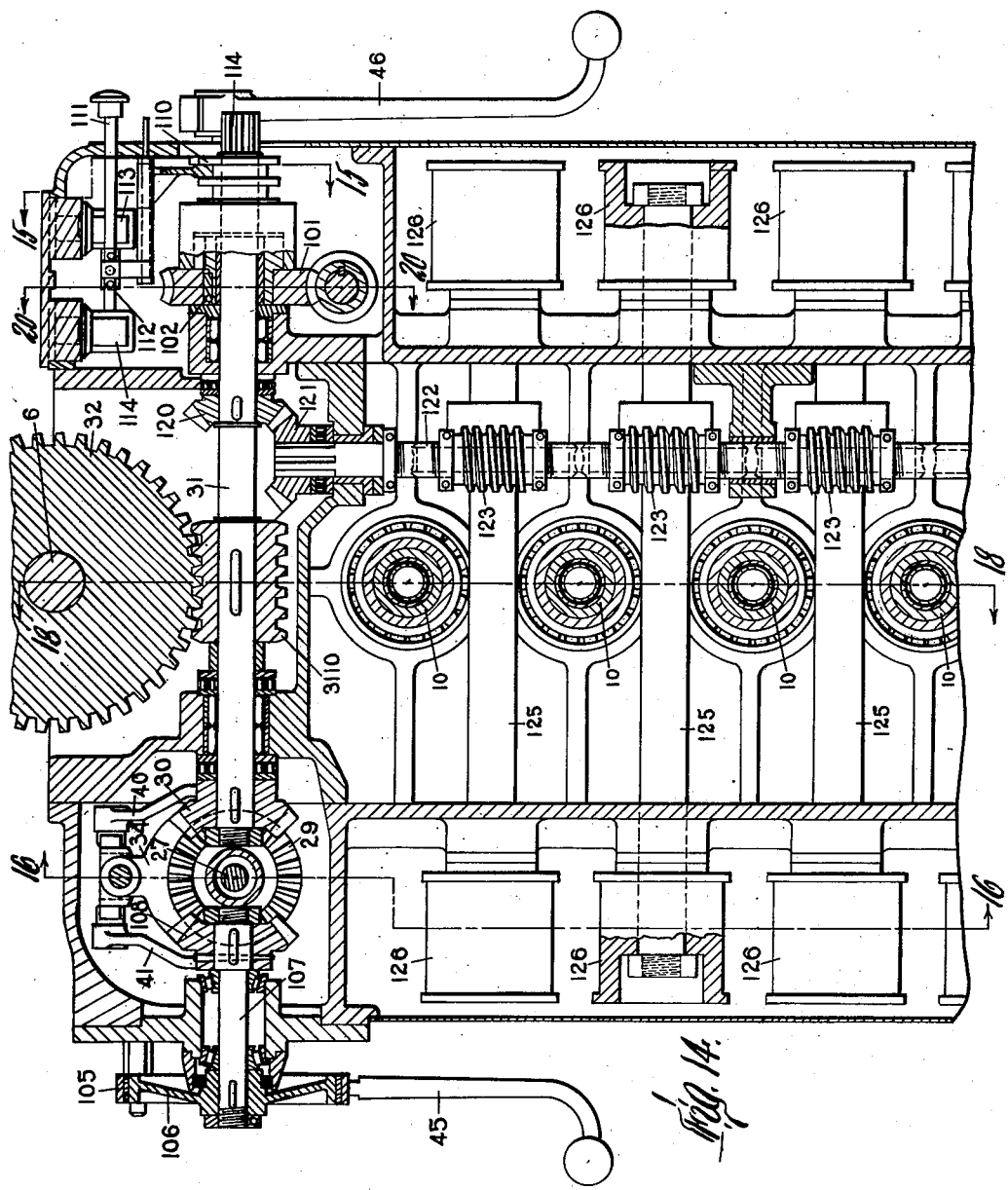

Figure 14 is a sectional view on line 14—14 of Figures 1, 2, 5, 16, 17 and 18.

Figure 15:
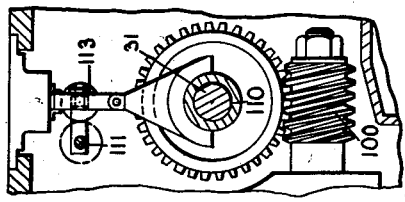

Figure 15 is a detail sectional view on line 15—15 of Figure 14.

Figure 16:
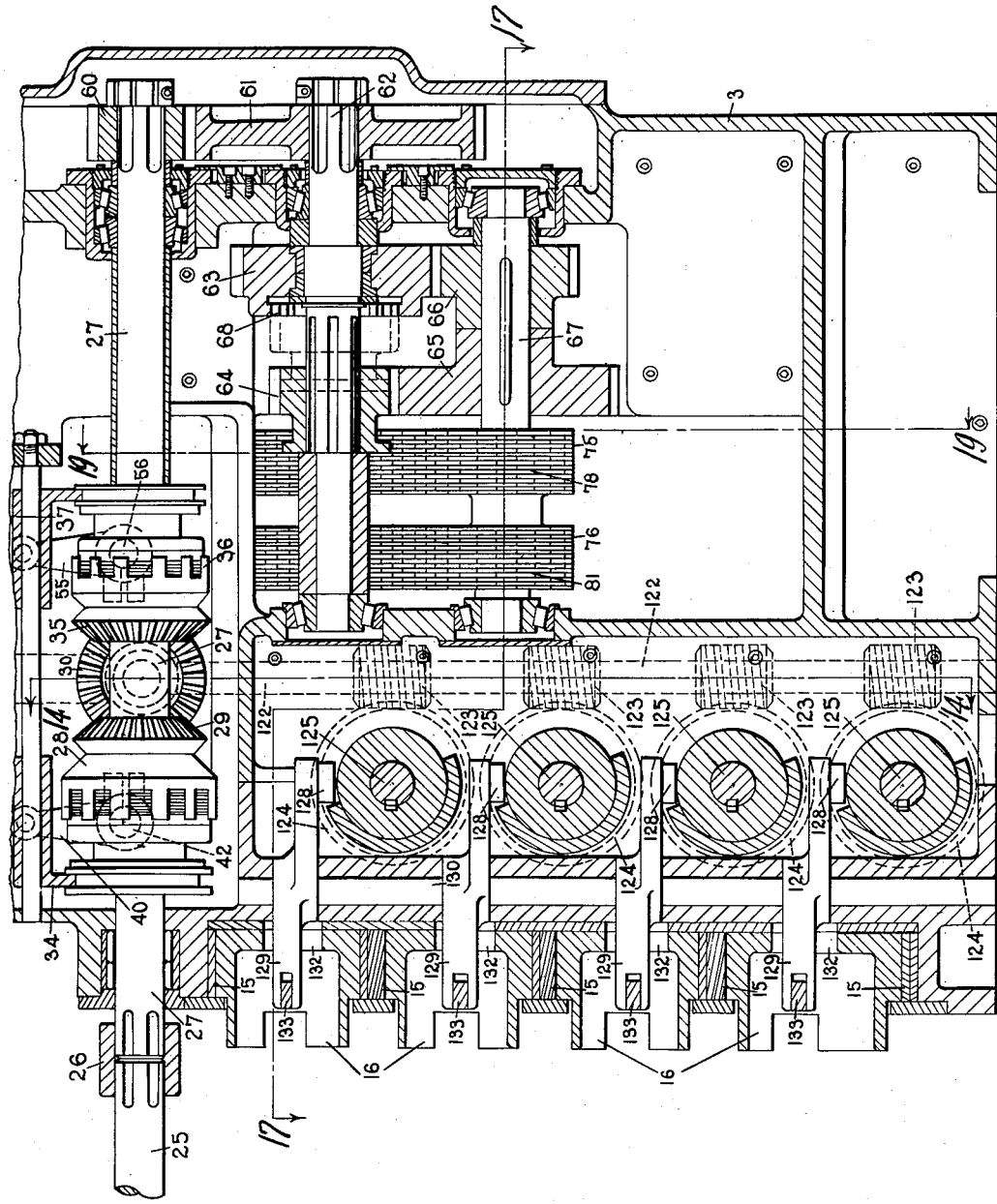

Figure 16 is a sectional view on line 16—16 of Figures 3, 14, 17 and 19.

Figure 17:
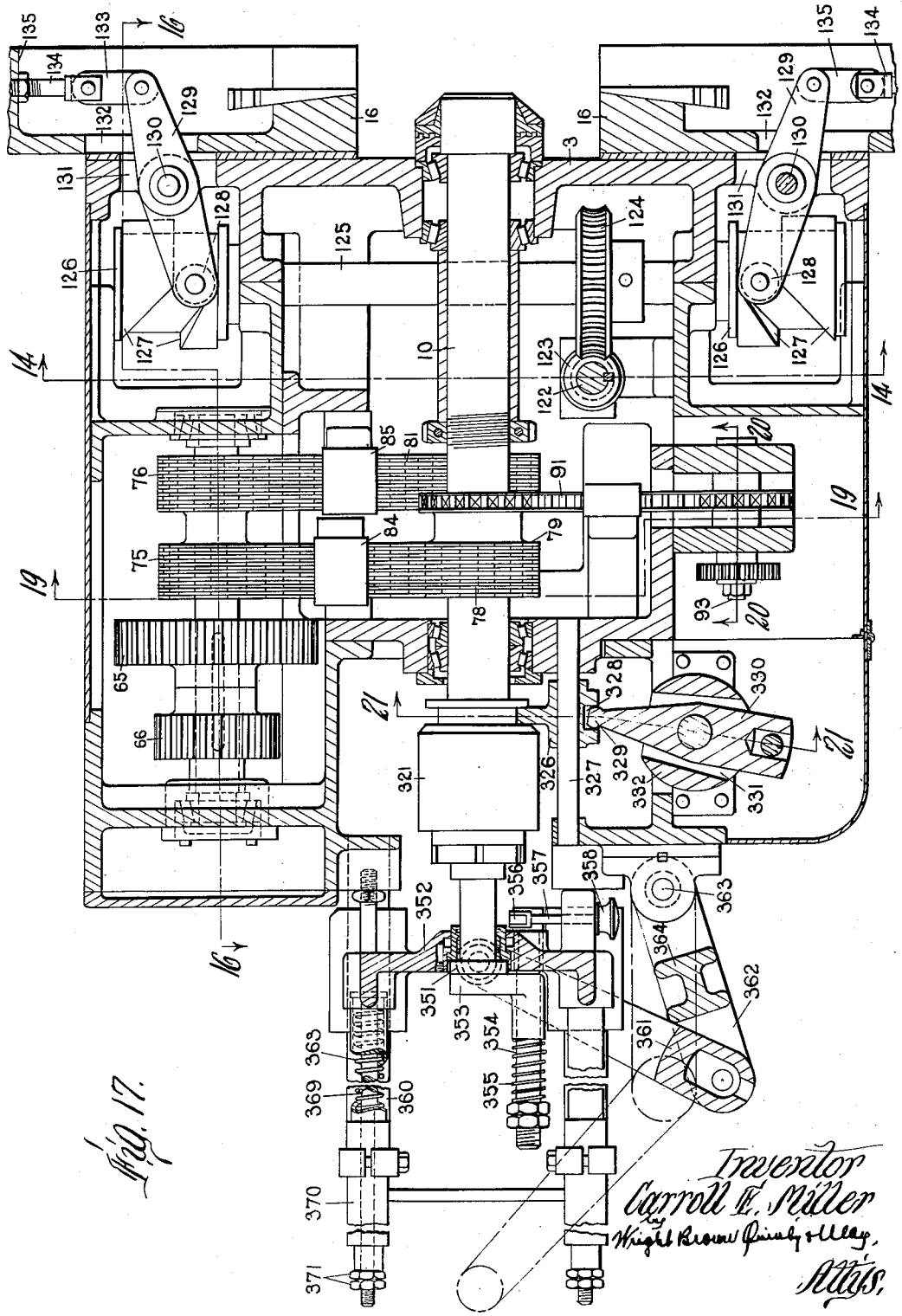

Figure 17 is a detail sectional view on line 17—17 of Figures 16 and 19.

Figure 18:
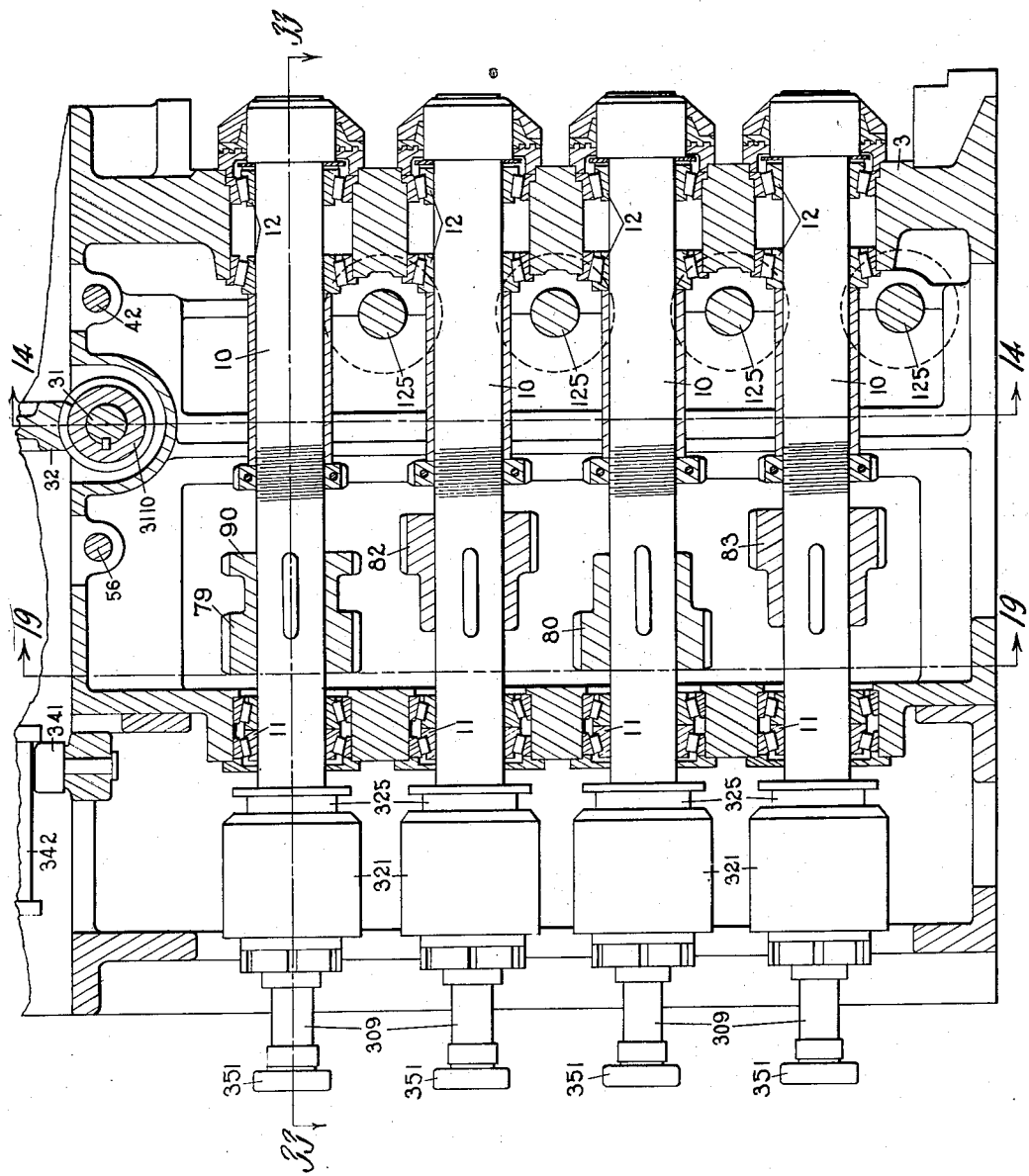

Figure 18 is a sectional view on line 18—18 of Figures 3 and 14.

Figure 19 is a sectional view on line 19—19 of Figures 1, 16, 17 and 18.

Figure 20 is a detail sectional view on line 20—20 of Figures 3, 14 and 19.

Figure 21 is a sectional view on line 21—21 of Figures 1 and 17.

Figure 22 is a fragmentary top plan view similar to a portion of Figure 2, but with the cover removed.

Figures 23 and 24 are detail sectional views on lines 23—23 and 24—24, respectively, of Figures 1 and 2.

Figure 25 is a detail sectional view on line 25—25 of Figure 1.

Figure 26 is a sectional view on line 26—26 of Figures 1 and 2.

Figure 27 is a view somewhat similar to a portion of Figure 26, but to a larger scale and in more detail.

Figure 28 is a detail horizontal sectional view on lines 28—28 of Figure 27.

Figure 29 is a fragmentary end elevation of a tool slide and its mounting and corresponds to the left hand end of the parts shown in Figures 27 and 28.

Figures 30 and 31 are vertical sectional views on lines 30—30 and 31—31, respectively, of Figures 1 and 8.

Figure 32 is a detail sectional view on line 32—32 of Figure 31.

Figure 33 is a detail longitudinal section through a work spindle on line 33—33 of Figure 18 and showing the work gripper closed.

Figure 34 is a view similar to a portion of Figure 33 but showing the gripper open.

Figure 35 is an electrical diagram of the machine controls.

The machine comprises, as shown best in Figures 1, 3, 4 and 26, a bed 1 on which is carried a pan 2 which supports the operative mechanism. Extending upwardly from the pan at one end is a column 3 which houses the work spindles and at the other end is a column 4 which houses various portions of the drive mechanism and connections for the end working tools. The columns 3 and 4 are connected at their upper ends by a longitudinal frame 5 within which is journaled an overhead cam shaft 6 by which much of the cycle of operations of the machine is actuated and controlled.

The column 3 carries a plurality of workcarrying spindles arranged in parallel relation to each other and in a single vertical plane, these spindles being shown best at 10 in Figure 18. As shown four spindles are employed, but more or less might be employed as desired. They are journaled in spaced sets of bearings 11 and 12 in the machine frame and are hollow to receive stock therethrough.

The forward or inner face of the column 3 is provided with a plurality of guideways 15 within which are slidable a pair of series of tool slides 16. There is one such tool slide on each side of the plane containing the axes of the spindles and there is a single tool slide corresponding to each spindle on each side of this plane. Since as shown there are four spindles in the machine, there are four tool slides 16 on each side of this plane, those on one side being front tool slides and those on the other side being rear tool slides, both being movable laterally of the axial direction of the spindles and each being located beyond the forward end of each spindle in such position that one or more tools 17 carried thereby may operate on work pieces projecting from the spindles.

Spindle drive

The work spindles 10 are rotated at either high or low speed, this being in accordance with usual practice. The driving power is taken from a suitable source such as a motor 20 mounted on a platform 21 at the top of the machine over the column 4 (see Figures 1, 2, 3, and 4). This motor 20 has its driving pulley 22 connected as by a belt or series of V belts 23 with a pulley 24 carried by a shaft 25 (Figures 1, 4, 11, 16 and 19) which extends lengthwise of the machine and is connected through a coupling 26 (Figure 16) with an extension 27 which is journaled in the column 3. Within this column the extension 27 carries a clutch 28, which, when closed, drives a beveled gear 29 meshing with a beveled pinion 30 on a cross column shaft 31 which has keyed thereto a worm 3110 (Figure 14), which, in turn, meshes with a worm wheel 32 secured to the cam shaft 6. The clutch 28 is controlled by a shifter yoke 34 (Figures 14, 16 and 24) and when in clutching engagement the shaft 31 is driven at high idle speed. The shaft 27 also carries journaled thereon a second beveled gear 35 (Figure 16) which may be clutched thereto as by the clutch 36 having a shifter 37 (Figures 16 and 23). When the clutch 28 is open and the clutch 36 is closed, the shaft 31 is driven in the reverse direction to that when the clutch 28 is closed and the clutch 36 is open.

When the high speed clutch 28 is open and the reverse clutch 36 is also open, the shaft 31 is normally driven at low working speed. The clutch shifter 34 for the high speed clutch 28 is connected through rocker arms 40 and 41, as shown best in Figure 24, to a pair of alined rock shafts 42 and 43 which extend out on opposite sides of the machine. On the rear face of the machine, the shaft 43 carries an actuating lever 45, while on the front face of the machine the shaft 42 is provided with an actuating handle 46. Intermediate between the ends of the shaft 42 it has attached thereto an arm 47 provided with a retractible cam follower 48, which, when projected may be contacted by a cam 49 on a cam drum 50 carried by the cam shaft 6. When the cam follower 48 is projected into engagement with the cam 49, this cam 49 may shift the high speed clutch into or out of operation while power driven, thus changing the speed of operation of the machine. When the follower 48 is retracted and locked out of engagement with the cam 49 by a cross pin 51 movable outwardly through a slot 52 and then turned out of registry with the slot, the operator may shift the high speed clutch into or out of operation by hand through the handle 46 for set up purposes. The reverse clutch 36, however, has its shifting yoke 37 actuated by a single arm 55 carried by a rock shaft 56. This is provided with an actuating handle 57 on the front face of the machine only. As shown in Figures 2 and 23, the rock shaft 56 has an arm 58 clamped thereto, which, when the handle 57 is moved to throw in the reverse clutch, moves the actuating lever 581 of a normally open switch LS1 to closed position, which, as will later appear, throws out the power feed clutch collar 110.

The slow or working speed is derived from the shaft 27 (see Figure 16) which at its extreme end is connected through a pair of change gears 60 and 61 to a shaft 62. This shaft 62 has a pair of gears 63 and 64 thereon, the gear 63 being larger than the gear 64. The gear 64 is slidably keyed to the shaft 62, while the gear 63 is journaled thereon. The gear 64 may mesh with a gear 65, and the gear 63 meshes with a gear 66, both keyed to a shaft 67. The gear 64 is of sufficiently smaller diameter than the gear 63 to be brought into or out of mesh with an internal gear portion 68 on the gear 63, in which mesh position it is out of mesh with the gear 65 and is locked to rotate with the gear 63. When it is in mesh with the gear 65, the drive of the shaft 67 is through the shaft 62, the gear 64 and the gear 65, but when the gear 64 is in its dotted line position of Figure 16, meshing with the internal gear 68, the drive is from the shaft 62 through the gear 64, the internal gear 68, the gear 63 and the gear 66, the latter drive being at a higher speed than the former, since the drive is from the gear 63 to the small gear 66, the gears 63 and 68 rotating as a unit. The axial position of the gear 64 is controlled by a shifter arm 70 (see Figures 5 and 6), carried by a rock shaft 71 which projects through the rearward casing of the machine and is provided with an actuating handle 72 accessible to the operator. A ball detent 73 enters either of a pair of depressions in one extension 74 of the shifter arm 70 (see Figures 5 and 7) to releasably retain the parts in either selected position. The speed of the shaft 67 is then dependent upon the selection of the two change gears 60 and 61 and the position of the handle 72.

The shaft 67 carries a pair of axially spaced sprocket wheels 75 and 76. About the sprocket wheel 75 passes a chain belt 78 which passes around a sprocket wheel 79 on the upper spindle 10, this sprocket chain also passing about the sprocket wheel 80 on the next to the bottom spindle 10 and back to the sprocket wheel 75. About the sprocket wheel 76 a similar chain 81 passes, this engaging around a sprocket wheel 82 on the next to the top spindle 10, and around a sprocket wheel 83 on the bottom spindle 10. It will be noted from Figure 18 that these spindle sprocket wheels are offset axially of the spindles, those on each alternate spindle being arranged in the same plane, but those of adjacent spindles being arranged offset from each other. The chains 78 and 81 may pass about suitable idlers 84 and 85 carried on opposite sides of an arm 86 fulcrumed at 87.

The top sprocket wheel 79 of the top spindle 10 has an integral relatively narrow sprocket portion 90 about which a sprocket chain 91 passes, this sprocket chain also passing around a sprocket wheel 92 carried by a shaft 93 (Figures 17 and 19). This shaft 93 connects through two sets of change gears 94 and 95 and 96 and 97 with a worm gear shaft 98, the change gears 95 and 96 being supported on the intermediate shaft 99. The worm gear shaft 98 carries a worm 100 meshing with a worm wheel 101 (see Figures 14 and 20, this worm wheel 101 being connected through an overrunning clutch at 102 with the worm shaft 31. Thus when the high speed clutch 28 is open, the cam shaft is driven at relatively low speed through the chain of connections just recited, including the overrunning clutch at 102, but whenever the high speed clutch 28 is closed, the high speed drive is effected through the high speed drive connections overrunning the low speed drive. When the high speed clutch is thrown out, a brake band 105 connected to the lever 45 is automatically tightened about a brake drum 106 on a shaft 107 having a pinion 108 at its inner end in driven relation to the high speed gear 29 (Figures 5, 14, and 19).

When desired the low speed drive may be unclutched from the shaft 31 at the overrunning clutch 102, as by shifting the clutch collar 110 (see Figure 14), and this may be done by hand, as by pressing upon a push rod 111 (see Figures 14 and 15), in which case the shaft 31 may be turned by hand by applying a suitable tool to the outer end of the shaft 31 which is shown as splined at 114 for this purpose. A solenoid core 112 connected to the rod 111 and actuated by solenoids 113 and 114 may be employed to close or open the clutch collar 110.

*Front and back tool slide mechanism*

As previously noted there are independent front and back tool slides 16 for each spindle. These are actuated from the worm shaft 31 which drives the cam shaft 6, and the means for doing this is shown in Figures 14, 16, 17, 18 and 26 to 29. Referring to Figure 14, the worm shaft 31 is shown as provided with a beveled pinion 120 with which meshes a beveled gear 121 secured to a vertical shaft 122. This shaft 122 is provided with four worms 123, three only of these being shown in Figure 14, which mesh with worm wheels 124 (see Figures 16 and 17) on cross cam shafts 125. There are four of these cam shafts 125 for the four spindles as shown in Figures 16 and 18, and they are offset from the axes of the spindles 10, the corresponding shaft 125 being beneath its spindle 10. Each of the shafts 125 carries a cam drum 126 at each end (Figures 14 and 17) and each cam drum is provided with cams 127 which act upon followers 128 secured to levers 129 horizontally fulcrumed on the pivot pins 130. The outer ends of the levers 129 extend through openings 131 of the column 3 and through slots 132 through the back walls of the tool slides 16, forwardly of which they are attached as by links 133 to draw bars 134 threaded through the outer end walls 135 of the slides. By this means the tool slides are caused to be given their in and out sliding motions to feed and retract the tools carried thereby with reference to work supported on the corresponding spindles. The outer end walls of these tool slides may be provided with positive stop buttons such as 140, which, at their inner limits of motion contact wear plugs 141 (see Figure 28). Tool carriers 145 may be carried by the tool slides and they may be adjusted axially of the spindles, as desired, by any suitable means such as the adjusting screws 146 each having a head 147 engaging any selected of notches 148 of a wedge block 142 backing up the carrier as shown in Figures 27 and 28. Endwise adjustment of the tool carriers may be produced by adjustment of the backing rod 149 threaded through the outer end wall 135 of the corresponding slide 16.

From the foregoing it will be seen that each of the tool slides may be moved independently of the others, being controlled by its respective cam 127 on one of the cam drums 126. It is thus possible to produce different toolings on the work pieces at each spindle should it be desired to do so. Since the motions of these tool slides are derived from the worm shaft 31, they partake of the same high and low speed characteristics which are imparted to the cam shaft 6.

*End working tools*

Besides the front and back tool slides, other slides which move parallel to the spindle axes and which may carry various tools may be employed. For example, as shown in Figures 1 and 8, the tool slides 150 may carry tools, such as end drills 151, coaxial with the work spindles. These slides 150 are supported at their outer ends in bearing sleeves 152 carried by a vertical support 153 which is mounted in guides 154 and 155 at its lower and upper ends, respectively. These slides 150 are arranged for axial motion and for this purpose they are provided with collars 160 having extensions through which are threaded rods 161 which may be fixed in adjusted position therein as by check nuts 162 on the rods 161 on either side of the corresponding collar 160. These rods 161 extend away from the work spindles and are attached to slide bars 165 and 166 which are mounted for guided axial motion in a frame support 167 as shown in Figures 8 and 9. It will be noted that the rods 161 are arranged in pairs, the two upper slides 150 being connected to the slide bars 165 and 166, respectively, and the two lower slides 150 being similarly connected to similar slide bars 165 and 166. It will be noted that the slide bars 166 are shorter than the slide bars 165 and are provided with lateral extensions 1670 which ride along the lower faces of the bars 165. Each of these extensions 1670 is provided with a cam follower roll 168 journaled thereon. The slide bars 165 at their outer ends have lateral extensions 169 which are turned downwardly and are slidably engaged with the upper face portions 170 of the recesses 171 into which the slide bars extend. The extensions 169 are provided with cam follower rolls 172 journaled thereon, the cam rollers 172 of the bars 165 and the cam rolls 168 of the bars 166 being in substantially horizontal alinement. With this arrangement of the slide bars 165 and 166 in pairs, it will be noted there will be an even number of slides 150. The cam follower rolls 168 and 172 in the upper pair of slides cooperate with cams (not shown) on a double cam drum 175. This double cam drum 175 is divided into endwise sections by a central flange 176, and the cams which act upon the cam follower 168 are located between the forward end of the cam drum 175 and this flange 176, while the cams with which the follower rolls 172 cooperate are located outwardly of the flange 176 and between it and the rear cam drum flange 177. Similarly the lower set of guide bars 165 and 166 are controlled by cams on the lower double cam drum 178. These double cam drums are journaled in a frame enclosure 179, to which access may be had by removing a cover 179a (Figure 8). The cam 178 is driven from the sprocket 189 fixed to the cam shaft 6 by a drive chain 180, passing around sprocket wheels 181 and 182, respectively, the sprocket 181 being an idler running on the shaft to which the cam 175 is keyed, and sprocket 182 being secured to the outer end of the cam drum 178. The upper double cam drum is driven by a drive chain 185 passing about a sprocket wheel 186 secured thereto, this chain 185 passing over a sprocket wheel 188 fixed to the cam shaft 6. This mechanism provides for the control of the axial motion and positioning of each of the slides 150.

The tools carried by the slides 150 are rotated, this being accomplished by their connections to splined shafts 190 which pass back into the column 4 and into correspondingly splined hollow shafts 192 journaled in opposite end walls of the column 4 (shown best in Figure 8). These shafts 192 extend through the outer end wall 193 of the column 4 and into an enclosure 194 to which access may be had from the end of the machine by removing a cover 195. The rear ends of the shafts 192 have sprocket wheels 200 secured thereto as best seen in Figures 4 and 8. Around the top and intermediate of these sprocket wheels 200 passes a drive chain 201 which may engage a driving sprocket wheel 202, and this sprocket wheel 202 may be placed selectively either on a shaft 205 (see Figure 11), or in case the end working tools are to include taps or other thread cutting elements, the sprocket wheel 202 may be applied in the dotted line position of Figure 11 to a shaft 206. In case no threading tools are to be employed, this shaft 206 may be omitted from the machine. The shafts 205 and 206, if one is employed, also have provision for a second sprocket wheel 208 similar to the sprocket wheel 202 but positioned axially spaced therefrom, and about this sprocket wheel 208 passes a second driving chain 210 which also passes about the sprocket wheel 200 of the lowest end working tool and the sprocket 200 of the next to the highest working tool. Thus each of these chains drives an alternately positioned end working tool of the vertical series, similar in this respect to the drives for the work spindles 10, as previously described. The shaft 206 is broken off in Figure 8 to show the gears 202 and 208 in full on the shaft 205 directly under it. The shaft 205 extends into a casing 220 within which it is connected by change gears 221 and 222 with a shaft 223 which is arranged parallel to the shaft 205 and is provided with a sprocket wheel 224 about which passes a chain drive 225 from a sprocket wheel 226 keyed to the main drive shaft 25. The shaft 223 at its end opposite to the change gear 222 may extend into a compartment 230 where it may be connected to drive certain accessories such as coolant and lubricant pumps which are not necessary to describe. The shaft 205 also has secured thereto a pair of gears 235 and 236 of different sizes, these being used only when the shaft 206 is employed when threading tools are to be employed. These gears 235 and 236 mesh with gears 237 and 238, respectively, journaled on the shaft 206, and either of which may be coupled thereto as by the clutches 239 and 240. The shaft 206 is shown in Figure 8 as hollow, and passing thereinto is an axially movable rod 243 which is connected to actuate the clutches 239 and 240 by axial motion (Figures 8 and 11). Suitable means for so moving this rod 243 may be coupled to its outer end, a threaded socket 244 being illustrated for this purpose. This arrangement of the two-speed drive for the shaft 206 provides for the drive of the end working tool shafts from the sprocket wheels 202 and 208 applied thereto at the two different speeds, one above and the other below the speed of rotation of the work spindles, thus to provide for threading in or onto and threading out or off of the work, the latter being necessary when threading is accomplished with non-collapsible or expansible threading tools.

The arrangement of the sprocket chains 201 and 210 from the sprocket wheels 202 and 208 as applied to the shaft 206 is shown in Figure 4a, Figure 4 showing the arrangement where the driving sprocket wheels 202 and 208 are on the shaft 205. In either case suitably placed idlers may be employed to take up slack in the chains.

In Figures 12 and 13 there is shown an arrangement for shifting the control rod 243 for the threading operation. As shown, the outer end of the rod 243 has coupled thereto a link 245 to the lower end of a lever 246 fulcrumed on the bracket 247. The upper end of this lever is pivoted to a link 247a to opposite ends of which are attached the plungers 248 and 249 of solenoid mechanisms 250 and 251 which may be energized in suitable time with the cycle of the machine to accomplish the desired speed change as will later appear.

*Spindle and stock feed and control mechanism*

Details of the individual spindles are shown in Figures 33 and 34. This subject matter is not claimed herein, however, as it is not per se my invention. These spindles 10 are hollow and carry integrally therewith an axially movable collet tube 300 to the outer end of which is threaded a spring collet 301 having the outwardly tapered portion 302 cooperating with a reversely tapered portion 303 of the spindle. The rear end of the collet sleeve 300 has threaded engagement with a pair of collars 305 and 306 secured together by screws 307 which lock the collars to the seleeve, the collar 305 having a hub portion 308 riding on the axially movable pusher sleeve 309. The spindle 10 has a reduced diameter rear portion 310 which provides an annular shoulder 311 against which is seated a ring 312. The rear face of this ring is inclined outwardly and forwardly as at 313, and forms a cam surface engageable with follower rolls 314 journaled at the free ends of a series of arms 315 arranged radially about the spindle, each pivoted as at 316 in a slot in a collar 317. This collar 317 abuts against the ring 306 which is attached to the collet tube or sleeve 311 so that when the arms 315 are moved inwardly in substantial parallelism with the spindle axis, the followers 314 riding inward along the cam face 313 are wedged to the left against the action of springs 318 seated in sockets 319 in the collar 317 and engaged by heads of screws 319a secured in the ring 312, thus forcing the collars 305 and 306 in the same direction and pulling the collet sleeve 300 in the same direction, thus to tighten the collet against the work. This action is accomplished by the backward motion of a sleeve 320 which has a tubular extension 321 surrounding and enclosing the ring 317 and the arms 315. This sleeve has a tapered tubular cam surface 322 which may engage the followers 314 so that as the sleeve is moved rearwardly, the followers are wedged toward parallel relation in the spindle axis until finally a concentric surface 323 on the sleeve rides over the followers 314 and locks them against outward motion. The sleeve 320 is provided with a peripheral groove 325 at its forward end with which may be engaged an actuating yoke 326 (see Figures 17, 21 and 22). Each of these yokes for the several spindles is slidable lengthwise of the spindle axis on a stationary guide bar 327 and its outer end is provided with a vertical notch 328 in which rides the inner rounded extremity 329 of a lever 330. Each of these levers passes through a slot 331 in a tubular rock arm 332 which is journaled on a vertical shaft 333. It will be noted from an inspection of Figure 17, that each slot 331 is considerably wider than the lever 330, and that the lever 330 is also pivoted on the shaft 333, so that it may be rocked about the shaft 333 independently of the rock member 332. This permits individual manipulation of each of the levers 330 for selective locking and releasing of any desired spindle collet, but provision is made by which all these levers can be actuated together by rocking of the rock member 332. To this end just above each of the slots 331, the rock member 332 is provided with an extension 335 overlying the outer end of the corresponding lever 330, and this extension and the corresponding lever have vertical openings therein through which a locking pin 336 may be dropped, each pin having a head 337 and an annular shoulder beneath the head at 338 to limit the downward motion of the pin. Each of these pins serves as a releasable locking device to lock the levers 330 to the rock member 332 so that as this is rocked, the several collets are simultaneously locked or released. In order to effect such locking and release in time with the operation of the machine, the rock member 332 is provided at its upper end with an inwardly extending arm 340, provided with a cam follower 341, arranged in the path of suitable cams on a cam drum 342 carried by the cam shaft 6. The locking pins 336 pass transversely through a socket 345 in the outer end of each lever 330, obstructing this socket against the entrance of a bar (not shown) which may be inserted therein when the corresponding pin 336 has been removed to unlock the lever from the rock member, and by which bar manual rocking of the individual lever may be facilitated when this is desired.

The inner sleeve 309 of each spindle, which carries at its forward end a stock pusher 350, is provided at its rear end with a headed collar 351 and as shown best in Figure 17, this collar may be held for rotation within a bearing carried by a vertical channel shaped bar 352 with rounded upper and lower ends as shown in Figure 3. Each collar 351 may be held within its bearing normally, by means of an arcuate latch 353 carried by a rock shaft 354 and normally held against the outer end of the member 352 by a spring 355. This rock shaft 354 is provided with an arm 356 to which is attached a pull rod 357 having a knob 358 on its outer end. By pulling outwardly on this knob, the rock shaft may be rocked in a direction to lift the latch 353 from obstructing relation to the pusher rod collar 351, permitting the insertion of a new piece of stock. The member 352 is guided for motion axially of the spindles on guide bars 360 and is moved automatically to produce the desired feed action of the stock by the rocking of a yoke 361 (see Figures 1, 3 and 17) pivoted at its upper and lower ends to links 362, which, in turn, are fulcrumed at 363 to the end column 3. The upper and lower links 362 are connected together by an integral vertical bar 364, which as shown in Figure 17 is of H cross section. The rock member 361 is provided with upper and lower inwardly extending arms 365 which are pivotally connected to upper and lower ends of the member 352, and the upper arm 365 carries a cam follower 366 which is engaged by an edge cam 367 (see Figure 1) secured to the cam shaft. The cam follower 366 is held into contact with this edge cam by springs 368 surrounding certain of the guide bars 369 on which the member 352 is slidably guided and enclosed within tubular covers 370. Check nuts 371 threaded on the outer ends of these guide bars serve to adjust the tension of the springs 368.

Stock stop

Forwardly of each of the work spindles is positioned a stock stop shown best in Figures 8, 30 and 31. Each stop comprises a rack bar 400 mounted for sliding motion in a way 401 in the support 153 arranged at an angle to the spindle axis so that as the stop is moved endwise it has a component of motion lengthwise of the spindle axis and another component of motion transversely thereof, bringing one end 402 into axial alinement with its respective spindle at a distance therefrom equal to the extent to which it is desired that the stock project from the spindle for the start of the tooling operation. This position of the parts is shown in Figure 8. A vertical shaft 405 which is journaled in the support 153, which also carries the bearings 152 for the end working tools, is provided with pinions 406 which mesh with the teeth of each of the rack bars 400, so that on rotation of the shaft 405 the stock stops may be moved into or out of operative position and when in inoperative position they are out of alinement with the work spindles so that they do not interfere with the tooling action. The upper end of the shaft 405 is provided with a beveled pinion 410, which as shown in Figure 32, is in mesh with a beveled pinion 411 journaled in a bushing 412 in the support 153. This pinion 411 is formed with a splined bore within which is slidably mounted a splined shaft 413. This splined shaft is journaled at its rear end in a stationary bearing 414 (see Figure 1), and forwardly of this bearing 414 it has secured thereto a spiral gear 415 of steep pitch. Meshing with this spiral gear 415 is a toothed segment 416 (see Figures 1 and 25) carried by a lever 417 which is pivoted between a pair of spaced plate members 418 and 419 on a pivot pin 420. Below the pivot, the plate 419 is apertured as at 421, and extending through the aperture is a cam follower extension 422 provided with a cam follower roll 423 at its end. This follower roll 423 engages suitable cams on a cam drum 424 carried by the cam shaft 6, so that at the start of the cycle, the rotation of the cam shaft rocks the arm 417 in a direction first to rotate the shaft 413 in the direction to project the stock stops into position, and after the stock is fed, the stock stops are retracted by rotation of the shaft 413 in the reverse direction by return of the lever 417 to starting angular position.

Provision is made also by which the stock stops can be moved as a unit longitudinally of the axes of the spindles in order to provide for different lengths of work to be projected from the spindles.

To this end, the support 153 is adjustable lengthwise of the spindle axis and this without interfering with the operative mechanism of the stock stops. To this end there is journaled vertically in the support 153, as shown best in Figures 8 and 30, a shaft 430 which carries at its upper and lower ends, pinions 431 which mesh with rack bars 432 mounted in fixed position in the end column 4. Thus by rotating the shaft 430, the support 153 is moved along these rack bars from or toward the ends of the work spindles. Rotation of this shaft 430 is effected at the support 153, and to this end the shaft 430 has secured thereto intermediate to its ends, a bevel gear 433 with which meshes a bevel pinion 434 carried by a horizontal shaft 435 journaled in the vertical back wall of the support 153 and having a splined outer end as at 436 for the reception of a suitable tool by which it may be turned.

Electrical machine controls

The electrical machine controls have been shown diagrammatically in Figure 35. The motor 20 is energized from the three-phase power lines 450, 451, 452 by means of the closing of the three-phase switch 453. Power is taken from across two lines such as 450 and 452 through the leads 454 and 455, leading through suitable fuses 456 and 457 to the terminals of a transformer primary 458 having the low voltage secondary terminals 459 and 460. The secondary terminal 459 connects through a lead 461 to one side of each of two sets of switches 462, 4620, 463 and 4630. These switches are normally open and one set, 462 and 463, is located on the front of the machine, while the switches 4620 and 4630 are at the back of the machine. Closing of either switch 462 or 4620 closes a circuit from the lead 461 through lead 464, the switch 462 or 4620, lead 465, switch-closing coil 466, leads 467, 484 and 468, back to the transformer secondary terminal 460. Energization of the coil 466 closes a switch 470, connecting the main power line 450 through lead 471, switch 470, lead 472, solenoid 113, lead 473, switch 470 and leads 474 and 475, back to the line 451. This energizes the solenoid coil 113 and closes the slow feed clutch at 110, this clutch remaining in the position in which it is put. Closing of either switch 463 or 4630 acts to open this same clutch, this being accomplished by establishing a circuit from the secondary terminal 459 through leads 461, 464, switch 463 or 4630, leads 480 and 481, through the switch closing coil 482 of the switch 483, leads 484 and 468, back to the secondary terminal 460. Closing of the switch 483 establishes a circuit from the line 450 through lead 471, switch 483, lead 485, solenoid 114, lead 486, switch 483 and lead 475 to the power line 451. This energizes the solenoid 114 and acts to open the power clutch at 110. During operation of the machine, of course, this clutch must be closed.

There are also on the front and back of the machine other pairs of switch buttons 490 and 4900, 491 and 4910, and 492 and 4920. The buttons 490 and 4900 are arranged either for open condition, in which event they serve as jog control buttons, or they may be closed, in which case they act as run buttons. They tend to remain in either open or closed positions.

To start the machine, both jog switches 490 and 4900 are closed and so held and then either start button 491 or 4910 is momentarily depressed. This action establishes a circuit connection from the transformer secondary terminal 460, through the leads 493, 494, the normally closed stop switch 492, lead 495, normally closed stop switch 4920, to lead 496. Closing of the start button 491 connects the lead 495 through this button to the lead 497, while closing of the start button 4910 connects the lead 496 to the same lead 497. In either case, from the lead 497, the circuit continues through the lead 498 to one terminal of the holding switch 499 and through lead 500 through main switch-closing coil 501, through the overload switch 502, lead 503 and overload switch 504, lead 505 and lead 461, back to the transformer secondary terminal 459. This closes the main switch which energizes the motor 20 from the lines 450, 451, and 452, through the high voltage leads 510, 511 and 512, two of the leads, 510 and 511, having interposed therein the actuating coils 513 and 514, respectively, of the overload switches 504 and 502, respectively. Both the switches 490 and 4900 being closed, the holding circuit is energized, this circuit including the switch 499, the lead 496 connecting through the lead 520 to the switch 4900, through the lead 521 to the switch 490 and through the lead 522 to the terminal 523 of the holding circuit which thus completes the circuit through the switch coil 501, even though the starting switch 491 or 4910 be released.

To stop the machine, either of the switches 492 or 4920 may be pressed, this interrupting the circuit to the main coil 501 and allowing the main switch to open, the circuit to this coil 501 passing through both of the normally closed stop switches as previously described.

When either of the switches 490 or 4900 is allowed to be open, the holding circuit is interrupted, so that the machine will stop on release of either start button which may have been closed to start it in operation. This is the jogging action.

At any time that the reverse drive handle is operated to reverse the direction of rotation of the machine, the machine is automatically stopped by throwing out the power feed clutch at 110. This is done by causing this handle, when it moves to reverse position, to close the switch LS1. This switch when closed connects the lead 481 to the lead 550 which connects to the lead 464, this switch LS1 thus being in parallel with the two normally open switches 463 and 4630, either of which, as previously described, when closed, throws out the power feed clutch at 110.

Threading tool speed control

In case a threading tool is employed, in which case the speed of rotation of the tool must be changed at the end of the threading operation to cause it to retract from the work, the change speed clutches 239 and 240 must be actuated by energization of either one or the other of the solenoids 250 and 251. This change from one to the other, the particular change depending upon whether right or left handed threads are being cut, is accomplished by the actuation of a switch LS2, from one to the other of its two closed positions, this switch LS2 being actuated as shown in Figure 2 by a cam 540 on the cam shaft 6. In the position shown in Figure 35, this switch LS2 is closed between a pair of leads 541 and 542, and in its other position it closes a circuit between leads 541 and 543. Lead 541 is connected from the secondary terminal 459 of the transformer through lead 461. When the switch LS2 connects to the lead 542, it establishes a circuit from this lead 542 through the switch coil 544, lead 545, leads 484 and 468 to the transformer secondary terminal 460. Energization of the coil 544 closes the two-pole switch 555 which establishes a circuit from the main power line 450 through leads 471, 551, switch 555, lead 552, solenoid 250, lead 553, switch 555, leads 554 and 475, back to the line 451. Energization of the solenoid 250 acts to throw the switch rod 245 (Figure 12) to one of its two-speed positions. Closing of the switch LS2 to establish a connection from the lead 541 to the lead 543 establishes a circuit from the lead 543 to the closing coil 560 of the switch 561, back through the leads 545, 848, and 468 to the secondary terminal 460 of the transformer. Closing of the switch 561 establishes a circuit from the power line 450 through leads 471, 562, switch 561, lead 563, solenoid 251, lead 564, switch 561, and through lead 475, back to the power line 451. This energizes the opposite coil 251 of the change speed clutch and changes to the other speed of rotation of the threading tool. The direction in which the switch LS2 is thrown by the cam depends upon the construction of the cam which is designed to operate the switch in the proper direction, depending upon whether right or left handed threads are to be cut.

From the foregoing description of an embodiment of this invention, it should be evident to those skilled in the art that various changes and modifications might be made without departing from its spirit or scope.

I claim:

1. A multiple spindle lathe comprising a plurality of parallel rotary work spindles arranged one above another with their axes in a plane, a frame in which said spindles are journaled, an even plurality of tool slides movable parallel to said spindles and having tools operating on work on certain of said spindles, double cam drums in number equal to one-half the number of tool slides mounted for rotation on axes parallel to said work spindles, two sets of cams spaced apart on said drums, a guide member, a pair of bars slidably guided by said guide member for each of said cam drums, cam followers carried by each of the bars of each pair one in operative relation to one set of cams and the other in operative relation to the other set of cams of each double cam drum, connections from each of said bars to one of said tool slides, and means for rotating said cam drums.

2. A multiple spindle lathe comprising a plurality of parallel rotary work spindles arranged one above another with their axes in a plane, a frame in which said spindles are journaled, an even plurality of tool slides movable parallel to said spindles and having tools operating on work on certain of said spindles, double cam drums in number equal to one-half the number of tool slides mounted for rotation on axes parallel to said work spindles, two sets of cams spaced apart on said drums, a guide member, a pair of bars slidably guided by said guide member for each of said cam drums, the bars of each pair being slidably guided on each other, cam followers carried by each of the bars of each pair one in operative relation to one set of cams and the other in operative relation to the other set of cams of each double cam drum, connections from each of said bars to one of said tool slides, and means for rotating said cam drums.

CARROLL E. MILLER.

REFERENCES CITED

The following references are of record in the file of this patent:

UNITED STATES PATENTS

| Number | Name | Date |
| --- | --- | --- |
| 1,139,752 | Brown | May 18, 1915 |
| 1,188,476 | Osterholm | June 27, 1916 |
| 1,765,130 | Cone | June 17, 1930 |
| 1,883,993 | Lee | Oct. 25, 1932 |
| 2,090,818 | Stanley | Aug. 24, 1937 |
| 2,170,633 | Drissner | Aug. 22, 1939 |
| 2,183,743 | Hoefer | Dec. 19, 1939 |
| 2,232,304 | Baker | Feb. 18, 1941 |
| 2,268,944 | Jones | Jan. 6, 1942 |
| 2,440,926 | Bogart | May 4, 1948 |
| 2,443,220 | Bechler | June 15, 1948 |